Sept. 5, 1950  J. C. GANTZ ET AL  2,521,057
PACKAGE CARRIER AND ENCLOSURE THEREFOR
Filed July 15, 1947  3 Sheets-Sheet 2
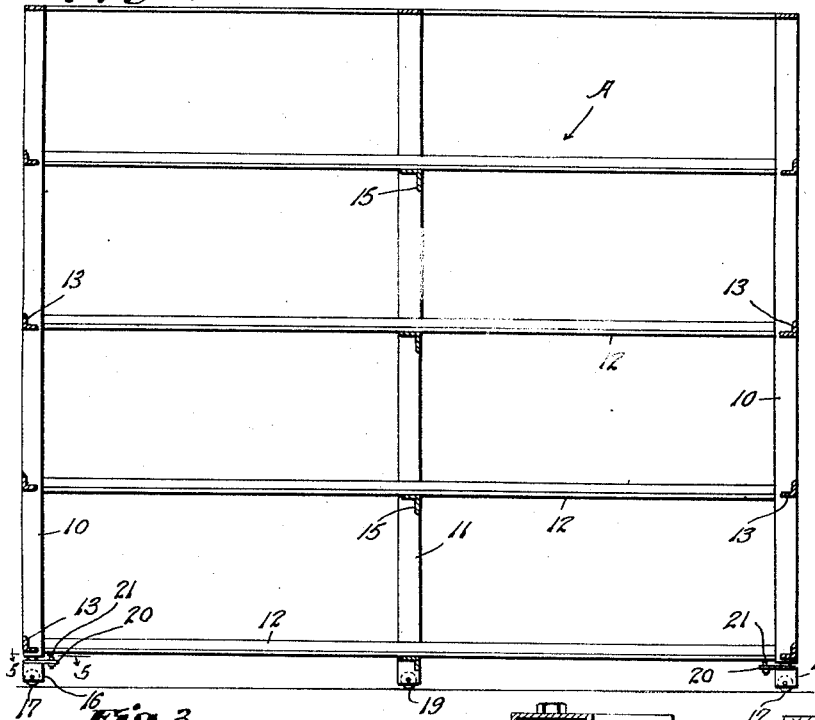
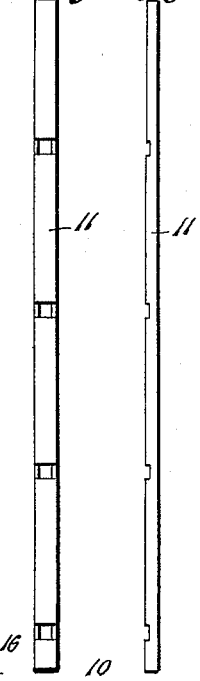
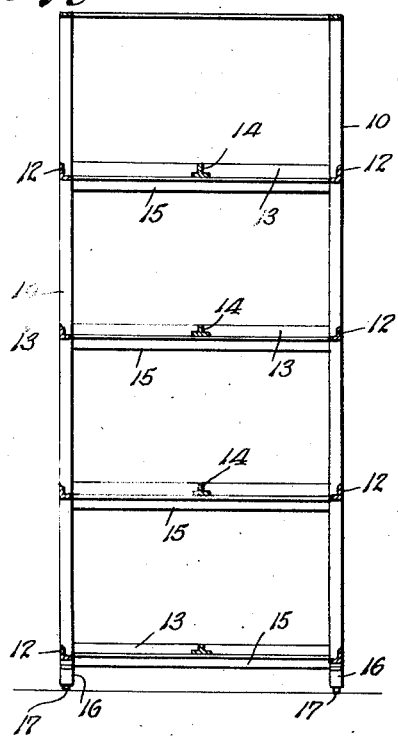
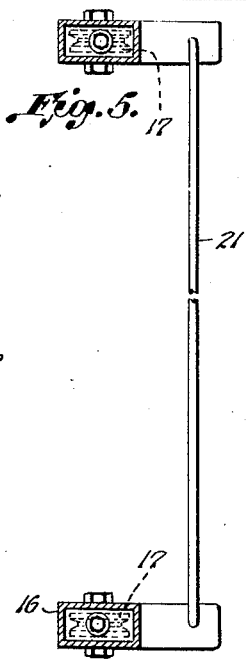
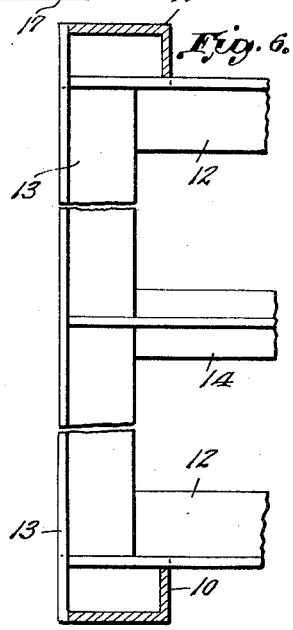
INVENTOR.
John C. Gantz
Walter J. Holl
BY  Ralph E. Everly
Attorney.

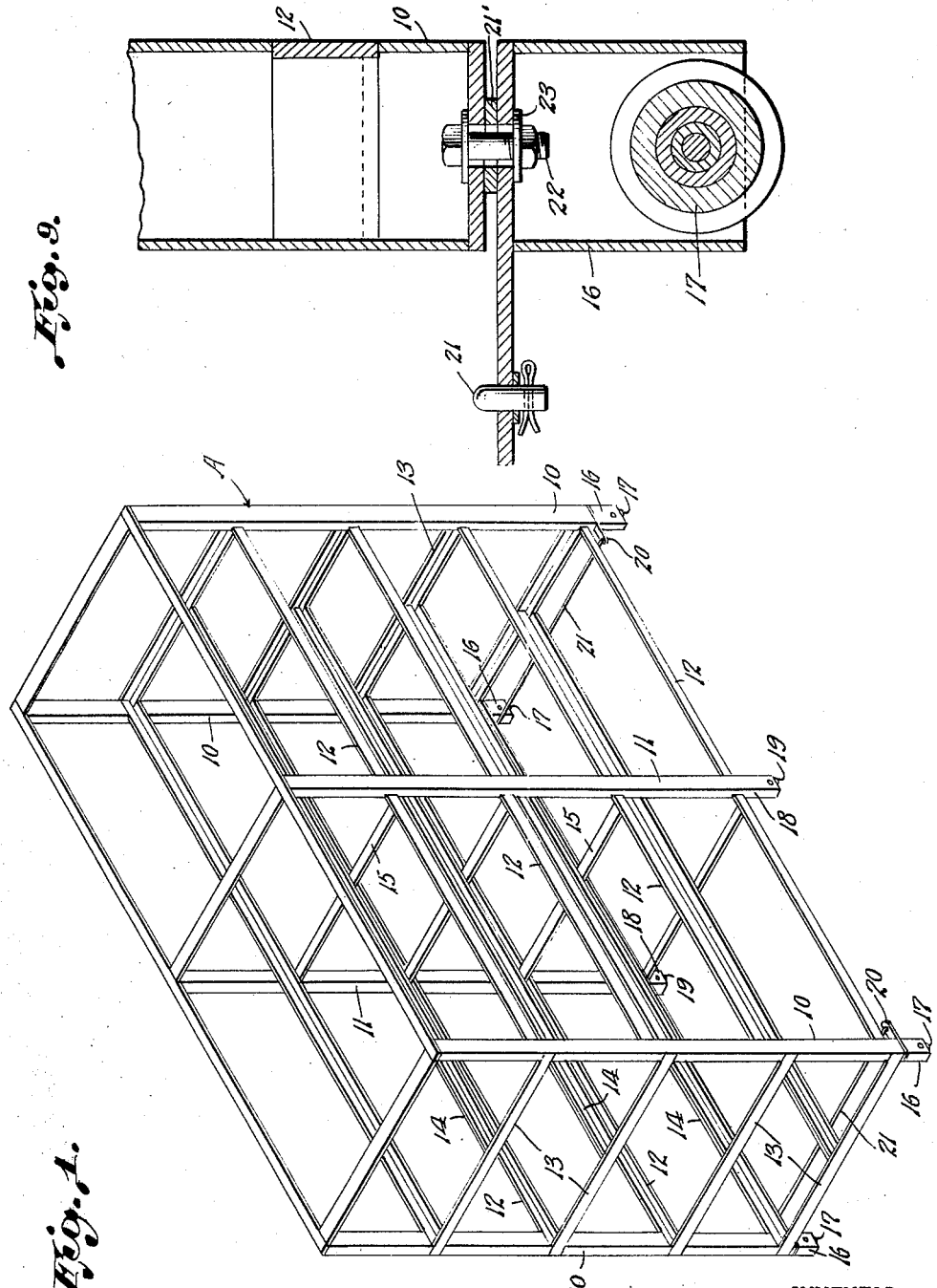

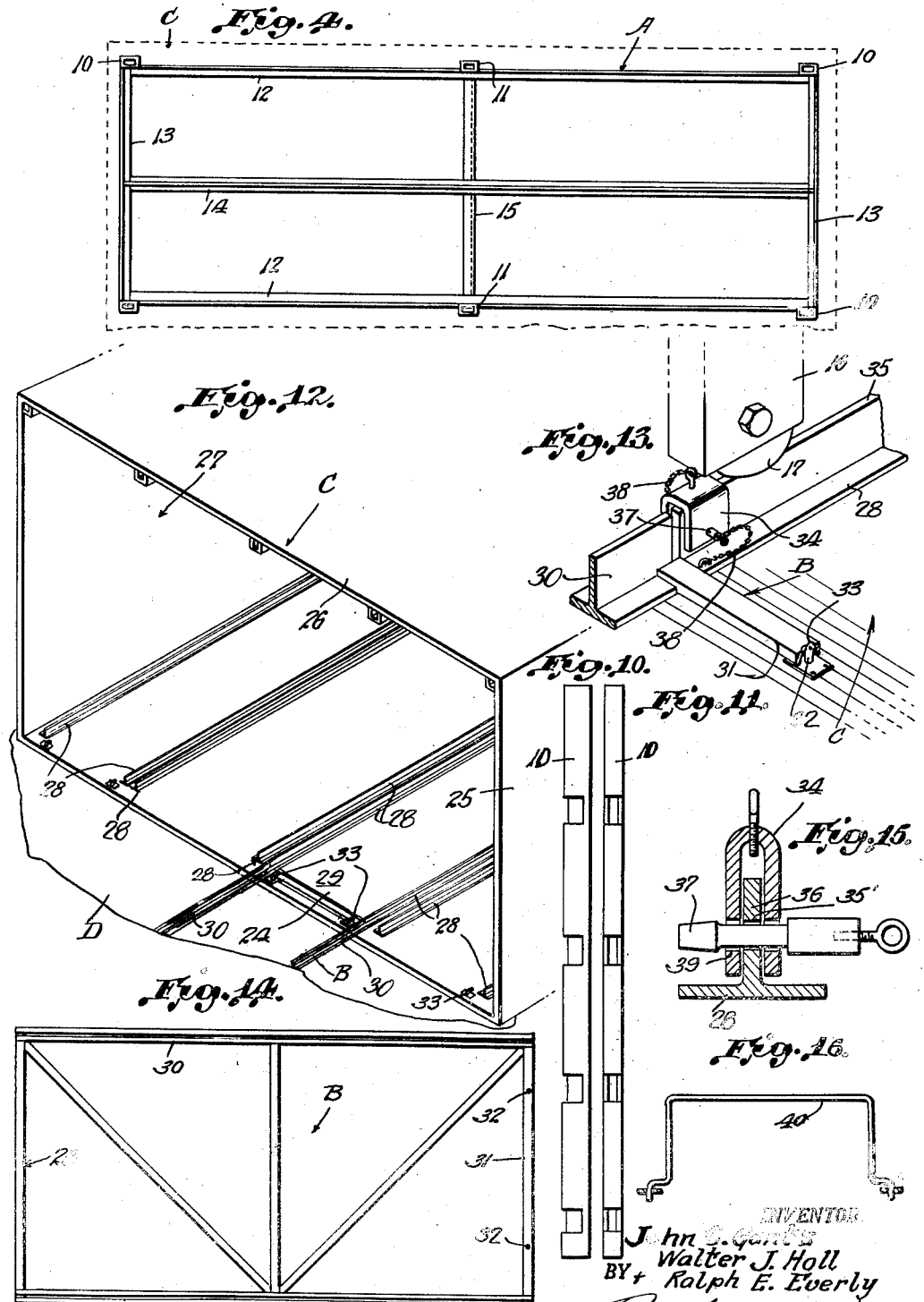

Patented Sept. 5, 1950

2,521,057

UNITED STATES PATENT OFFICE 2,521,057

PACKAGE CARRIER AND ENCLOSURE THEREFOR

John C. Gantz, Walter J. Holl, and Ralph E. Everly, Dubuque, Iowa

Application July 15, 1947, Serial No. 760,992

4 Claims. (Cl. 104—1)

The invention relates to a hand truck, and more especially to a bottle and package carrier and storage enclosure therefor.

The primary object of the invention is the provision of a set-up of this character, wherein the same enables the handling of packaged units both in a plant and in the loading and unloading of such units to and from a vehicle or other place of deposit.

Another object of the invention is the provision of a set-up of this character, wherein the carrier proper can be wheeled about in a confined area, if necessary, and thence to a loading dock or the like, where by the use of a portable track it can be properly located and locked in such position, the set-up being also readily wheeled onto a truck or other vehicle, when the occasion requires.

A further object of the invention is the provision of a set-up of this character, wherein the construction thereof is novel and unique in assembly, it being readily and easily handled with dispatch and minimizes labor in this connection and is most convenient for facilitating the transportation of articles, packaged goods or the like.

A still further object of the invention is the provision of a set-up of this character, which is simple in construction, thoroughly reliable and efficient in operation, strong, durable, light in weight, compact, and neat in appearance, possessed of few parts, and inexpensive to manufacture.

With these and other objects in view the invention consists in the features of construction, combination and arrangement of parts as will be hereinafter fully set forth in detail, illustrated in the accompanying drawings, which disclose the preferred and modified forms of construction of the invention, and pointed out in the claims hereunto appended.

In the accompanying drawings:

Figure 1 is a perspective view of the carrier constructed in accordance with the invention.

Figure 2 is a vertical longitudinal sectional view thereof.

Figure 3 is a vertical transverse sectional view of such carrier.

Figure 4 is a bottom plan view.

Figure 5 is a horizontal cross-sectional view taken on the line 5—5 of Figure 2 looking in the direction of the arrows.

Figure 6 is an enlarged fragmentary horizontal transverse sectional view taken through the body of the carrier.

Figure 7 is an elevation of one of the tubular stanchions of the body of the carrier.

Figure 8 is a side view thereof.

Figure 9 is a fragmentary vertical section through a stanchion with the wheel and swivel assembly in association therewith.

Figure 10 is an elevation of another of the stanchions of the body of the carrier.

Figure 11 is an edge view of the same.

Figure 12 is a fragmentary perspective view of the storage enclosure for one or several of the carriers with trackage arrangement for the same within.

Figure 13 is a fragmentary perspective view showing the carrier wheel lock associated with the trackage for the carrier.

Figure 14 is a detail plan view of a portable trackage for the carrier.

Figure 15 is a vertical sectional view through a wheel lock for the carrier.

Figure 16 is a modified form of tie rod for each pair of wheels for the carrier.

Similar reference characters indicate corresponding parts throughout the several views in the drawings.

Referring to the drawings in detail, the set-up constituting the present invention comprises a wheeled carrier denoted generally at A, in its entirety, and a trackage indicated in part at B, generally, as well as a storage enclosure identified generally at C, respectively.

The carrier A, in accordance with the invention involves a substantially rectangular shaped framing forming a rack, having outer and intermediate vertical stanchions 10 and 11, respectively, which are preferably of tubular construction, the stanchions 10 being located in pairs spaced from each other at opposite ends of the framing, while the stanchions 11, which in this instance is a pair, have location midway between the said stanchions 10, as is clearly obvious in Figures 1 and 2 of the drawings.

Set into the stanchions 10 and 11, respectively, are horizontally disposed vertically spaced side and end cross rails 12 and 13, respectively, the stanchions and rails being preferably made from metal, and in their interfitting points are welded or otherwise united together to give rigidity to the framing under erection of the same, the said rails 12 and 13 being of L-shape in cross section. Longitudinal and intermediate center cross braces 14 and 15, respectively, are provided in the framing, there being only one longitudinal brace shown, which is located at the bottom area of the framing, and this arrangement exists at superposed areas of the latter, thus dividing such framing into package receiving spaces within the same, these being accessible from either side or ends of the carrier as will be apparent.

The stanchions 10 at their lowermost ends carry swiveled caster boxings 16, each creating a socketed shield housing for exposure of a horizontally journaled caster wheel 17, the exposure being only partial for the contact of the wheel with a foundation, so that the carrier can be pulled or pushed by hand or otherwise from one locality to another, at the will of a user.

The stanchions 11 at their lower ends are extended correspondingly to the height of the boxings, and within each end 18 is horizontally journaled a caster wheel 19, which makes contact with a foundation similar to the contact of the wheels 17, and thus it will be seen that the carrier is freely movable.

Each boxing has its top portion closed by a laterally extended turning arm 20, so that through the medium of a cross-tie rod 21, the pairs of boxings common to opposite ends of the carrier having the rod 21 pivotally connected thereto will turn in unison for the guiding of the said carrier in the desired course, as well as for making a turn in a close area. The bushing, washer and pivot or coupling pin 21, 22 and 23, respectively, effect the swivel between each boxing 16 and the stanchion 10, next thereto, as will be apparent from Figure 9 of the drawings.

One or a determined number of the carriers A, whether loaded or unloaded, are adapted to be confined within an enclosure as exampled at C, in Figure 12 of the drawings, and such enclosure comprises a box or crate, including a bottom 24, which is a flooring, vertical side walls 25, a top 26, and opposite open and closed ends, the open end being indicated at 27, while the closed end being not shown. The bottom 24 has fixed thereto suitable track rails of the single tread-flange type 28, which guide the peripherally grooved wheels 17 and 19 of each carrier A into and from the enclosure, and each carrier when in such enclosure will be nested therein, for convenient shipment or storage. The enclosure C is adapted to portably rest upon a floor or like foundation, a portion of the same being indicated generally at D.

For enabling the easy and convenient introduction and removal of each carrier to and from the enclosure C there is provided a portable trackage B, it involving a properly gauged track bed 29 having spaced parallel rails 30 similar to the rails 28 forming a guide track in the direction of its length, while at one end of this bed 29 in its cross member 31 are holes 32 for receiving anchoring lugs 33 arranged at the open entrance end 27 of the enclosure C for the detachable fastening of this portable trackage B to the flooring of the latter, so that the carrier will be guided into the said enclosure C for storage or placement therein, the attachment of the trackage and the enclosure being clearly shown in Figure 13 of the drawings. Each rail of the trackage within and without the enclosure C is of the inverted substantially T-form, including the flat base and upstanding vertical web, the latter being extended substantially the depth of the groove in the periphery of each roller. It is to be understood that there is a single track involving two spaced rails of the above-named type forming a part of the portable trackage, while within the enclosure C there is a plurality of tracks, each involving two spaced rails as above defined.

For locking the carrier A within the enclosure C there is provided a wheel lock which comprises an inverted substantially U-shaped block or stop member 34 for saddling the web portion 35 of a track rail 28, the latter being provided with a suitable hole 36 properly located for receiving a locking pin 37 which through a connecting chain or cable 38 has attachment with the base of the rail 28 within the carrier C the member 34 being provided with registering clearances 39 for the pin 36 to engage the hole 36, so that the member 34 will be fixedly set to the rail 35 and thus block the wheel of the carrier A to hold the same against moving out of the enclosure C when therein.

In Figure 16 of the drawings there is shown a modification of tie-rod 40, which may be a substitute for the rod 21, if desired.

The salient feature of the invention is the mobile carrier for nesting within the enclosure with the trackage within the latter and its travel on and from the trackage directly off of and onto a foundation or flooring outside of and supporting the enclosure, and this enclosure enabling the handling of one or more of the carriers when stored therein and for convenient transportation thereof. The enclosure C effects a package for the carrier or carriers when nested within such enclosure, so that the assembly can be easily and conveniently transported or shipped and also for handling whether the carrier or carriers are loaded or unloaded. The grooved wheels 17 and 19 interfit the webs of the rails 30 and 28, respectively, as the webs of such rails are very shallow, so that the said wheels travel from the floor or foundation onto the trackage or off of the same without requiring the manual lifting of the carrier, the grooves in such wheels being of a depth for this free on and off travel with ease.

The utility of the structure in its entirety constituting the present invention resides in the facts that the carrier facilitates the handling of unpackaged or packaged articles in a plant and during transportation. The carrier when outside of the enclosure and within the plant or the like can be moved freely over a foundation from one room or section to another of said plant or the like to permit easy loading and unloading of the said carrier for storing or unstoring of the articles with ease and dispatch. Each of the carriers can be introduced into the box-like enclosure which is easily placed onto a vehicle for the transportation of the enclosure with the carrier, either loaded or unloaded, within the said enclosure, to any locality desired, whence the said carrier can be removed from the enclosure after the latter has been taken from the vehicle and rolled to any point or points in the new location for the loading or unloading as the occasion may require for the purposes before named. In the placement of the carrier within the enclosure from a foundation it need only be pushed onto the portable track without the lifting of the said carrier and the removal of the said carrier from the enclosure requires only the pulling of the carrier from the trackage onto the foundation, this being due to the particular interfitting of the trackage and caster wheels with each other as before described.

It is of course understood that changes, variations and modifications may be made in the invention, as fall properly within the scope of the claims hereunto appended, without departing from the spirit of said invention or sacrificing any of its advantages.

What is claimed is:

1. An assembly for the travel of a wheeled package carrier directly from and to a floor plane over portable trackage into and out of a portable enclosure for the carrier, comprising a portable trackage having shallow vertical rail webs, means removably attaching the portable trackage directly to the portable enclosure only for entrance and exit of said carrier to and from the said enclosure, and peripherally grooved swivel caster wheels on the carrier for engaging the floor plane and interfitting the rail webs, respectively, whereby the said carrier will freely roll directly from the foundation of floor plane over the trackage into the enclosure and vice-versa.

2. An assembly for the travel of a wheeled package carrier directly from and to a floor plane over portable trackage into and out of a portable enclosure for the carrier, comprising a portable trackage having shallow vertical rail webs, means removably attaching the portable trackage directly to the portable enclosure only for entrance and exit of said carrier to and from the said enclosure, peripherally grooved swivel caster wheels on the carrier for engaging the floor plane and interfitting the rail webs, respectively, whereby the said carrier will freely roll directly from the floor plane over the trackage into the enclosure and vice-versa, and permanent trackage within the enclosure at its bottom for matching the portable trackage to guide the carrier into and out of the enclosure.

3. In a movable article carrier and portable enclosure therefor, parallel plural trackage fixed within the enclosure at its base involving a pair of rails to each track having a base flange and an upstanding shallow and narrow gauged web, a portable trackage detachably engaged with the enclosure at its base and having rails corresponding to the rails within the enclosure for alignment with each selected track therein to effect continuation of the same to a foundation outside of said enclosure when the portable trackage is at rest thereon, and swiveled caster wheels on the carrier having peripherially grooved treads for travel directly upon the foundation and freely interfitting the trackage rails, respectively, whereby the carrier can pass directly to and from the foundation and enclosure through push and pull action on the said carrier without manual lifting of the latter.

4. An assembly of the kind described, comprising: a portable box-like enclosure having a base for rest upon a flooring, a plurality of side-by-side tracks permanently fixed to the base for confinement within the enclosure, a portable track for rest upon the flooring outside of the enclosure for alignment with a selected track within the latter, means detachably connecting the portable track to the base of the enclosure aligned with the selected track therein to continue the latter onto the said flooring, and a vehicular carrier having caster wheels interfitting with the tracks for travel thereon, whereby said carrier will move into and from the enclosure directly from and onto said flooring without manual lifting of said carrier and by push and pull action.

JOHN C. GANTZ.
WALTER J. HOLL.
RALPH E. EVERLY.

REFERENCES CITED

The following references are of record in the file of this patent:

UNITED STATES PATENTS

| Number | Name | Date |
| --- | --- | --- |
| 764,184 | Ellenberger | July 5, 1904 |
| 1,017,290 | Ham et al. | Feb. 13, 1912 |
| 1,784,367 | Long | Dec. 9, 1930 |
| 2,019,949 | Brace | Nov. 5, 1935 |
| 2,312,273 | Stochmal | Feb. 23, 1943 |